United States Patent [19]

Kawai

[11] 4,344,335
[45] Aug. 17, 1982

[54] POWER DISTRIBUTING DEVICE FOR VEHICLES

[75] Inventor: Shunichi Kawai, Aichi, Japan

[73] Assignee: Aisin Seiki Kabushiki Kaisha, Kariya, Japan

[21] Appl. No.: 86,308

[22] Filed: Oct. 19, 1979

[30] Foreign Application Priority Data

Oct. 24, 1978 [JP] Japan .................... 53/131139

[51] Int. Cl.³ ............... F16H 37/06; F16H 37/08; F16H 3/38; F16D 11/00
[52] U.S. Cl. .................... 74/674; 74/665 T; 74/665 GA; 74/701; 74/339; 192/53 F; 180/247; 180/250
[58] Field of Search .......... 74/674, 665 F, 665 G, 74/665 GA, 665 T, 781, 339; 192/53 E; 180/247, 248, 249, 250

[56] References Cited

U.S. PATENT DOCUMENTS

| | | | |
|---|---|---|---|
| 3,296,895 | 1/1967 | Karlsson | 74/781 R |
| 3,426,623 | 2/1969 | Abbott | 74/781 |
| 3,470,766 | 10/1969 | Magg et al. | 74/665 T |
| 4,125,179 | 11/1978 | Cochran et al. | 192/53 E |
| 4,138,007 | 2/1979 | Wakabayashi | 192/53 E |
| 4,188,838 | 2/1980 | Nakao et al. | 74/665 GA |

FOREIGN PATENT DOCUMENTS 52-151543 12/1977 Japan .

Primary Examiner—C. J. Husar
Assistant Examiner—Lawrence J. Gotts
Attorney, Agent, or Firm—Oblon, Fisher, Spivak, McClelland & Maier

[57] ABSTRACT

A power distributing device for four-wheel-drive vehicle including an input shaft, a first output shaft for transmitting power to rear wheels, a second output shaft for transmitting power to front wheels, a plane planetary gear set, a power train changing means and a synchronizing means. The plane planetary gear set includes a sun gear having a hollow shaft, a ring gear connected with the first output shaft, a planet carrier drivably connected with the input shaft, and planet gears carried by the planet carrier and engaged with the sun gear and the ring gear. The power train changing means includes a sliding sleeve and a sliding tube slidably mounted on the hollow shaft, engaged movably with the hollow shaft only in its axial direction, the sliding sleeve being selectively movable to engage either with a stationary portion of the device in a rear-wheel-drive condition or with the sun gear in a direct four-wheel-drive condition and a power distributing four-wheel-drive condition, the sliding tube being selectively movable to engage with the planet carrier in the direct four-wheel-drive condition. The synchronizing means is provided to inhibit nonsynchronous engagement of the sun gear with the stationary portion or the second output shaft.

2 Claims, 5 Drawing Figures

POWER DISTRIBUTING DEVICE FOR VEHICLES

BACKGROUND OF THE INVENTION

1. Field of the Invention

The present invention relates to a power distributing device for a vehicle and more particularly to an apparatus for selectively distributing power to the rear wheels or to the front and rear wheels for four-wheel-drive according to the condition of the road.

2. Description of the Prior Art

In known apparatus of the type with which the present invention is concerned, a power distributing device is provided for selectively operating the power train corresponding to various driving conditions, for instance, to a rear-wheel-drive condition in which power is not transmitted to the front wheels but transmitted to rear wheels only in low load and high speed driving, to a power distributing four-wheel-drive condition in which power is distributed properly to both front and rear wheels in heavy duty driving requiring large driving power, and to a direct four-wheel-drive condition in which power is directly transmitted to front and rear wheels without distribution in driving on sand or in mud.

In an apparatus of this type disclosed in a Japanese Official Gazette for Unexamined Utility Model Application No. 151543/1977 (Laid open date Nov. 17, 1977), a ring gear of a plane planetary gear train is connected with an output shaft for transmitting power to the rear wheels, a planet carrier carrying planet gears of the gear set is engaged with a gear driven by an output shaft of a transmission of the vehicle and the sun gear of the gear set is selectively engaged with a stationary portion of the apparatus, with an output shaft transmitting power to the front wheels or with the planet carrier. This device facilitated the operation by arranging the operating positions of an operating lever for the rear-wheel-drive condition and the power distributing four-wheel-drive condition, which are frequently selected adjacent to each other, and by arranging the position for the direct four-wheel-drive condition, which is less frequently selected, on the reverse side of the position for the power distributing four-wheel-drive condition but on the other side with respect to the rear-wheel-drive condition. However, feasibility of operation of the device to select the rear-wheel-drive condition and the power distributing four-wheel-drive condition while driving a vehicle is not satisfactory.

A power transmission having a plane planetary gear set disclosed in U.S. Pat. No. 3,426,623, patented Feb. 11, 1969, provides a synchronizing device for selectively operating the change-speed gearing either in direct drive condition or in planetary overdrive condition.

In the transmission, the ring gear of the plane planetary gear set is connected with an output shaft, the planet carrier of the gear set is connected with an input shaft and the sun gear of the gear set is selectively engaged either with a stationary portion of the transmission or with the planet carrier. The synchronizing device for the transmission (i.e. inertia fastening type Borg-Warner synchronizer) is provided for synchronously engaging a sliding tube, slidable only in the longitudinal direction on a member formed integrally on the sun gear, either with the nonrotary member or with peripheral teeth on the planet carrier.

However, more additional provision of a power distributing device for a four-wheel-device vehicle of the combined power train of a plane planetary gear set and a synchronizing device disclosed in U.S. Pat. No. 3,426,623, is disadvantageous in view of the capacity of the synchronizing device, and furthermore, there is difficulty in applying the aforementioned combined power train to a power distributing device having more than three operational positions including direct four-wheel-drive condition.

SUMMARY OF THE INVENTION

It is a general object of the present invention to overcome these disadvantages existing in this field.

It is also an object of the present invention to provide for a power distributing device for a vehicle of the aforementioned kind which is of simple construction and arranged in such a manner that the power train can be smoothly changed while driving the vehicle.

With these objects in view, the power distributing device of the present invention comprises a plane planetary gear set, an input shaft, a first output shaft for transmitting power to wheels which mainly drive the vehicle, a second output shaft for transmitting power to wheels which drive the vehicle secondarily with the aforementioned wheels, power train changing means and synchronizing means.

A plane planetary gear set includes a sun gear, a ring gear, a planet carrier and planet gears carried on the planet carrier and engaged with the sun gear and the ring gear. The input shaft is drivably connected with the planet carrier of the gear set and the first output shaft is connected with the ring gear of the gear set The second output shaft is arranged coaxially with the sun gear of the gear set.

The power train changing means includes a sliding sleeve and a sliding tube arranged coaxially and loosely connected with each other. The sliding sleeve and the sliding tube are slidably mounted on and movably engaged with a shaft portion of the sun gear only in its axial direction, and the sliding sleeve is selectively movable to engage with the second output shaft without releasing engagement with the sun gear or with a stationary portion of the device.

In the power distributing device of the present invention when the power train changing means is operated (1) in its direct four-wheel-drive condition, the sliding sleeve is engaged with the sun gear and the sliding tube is engaged with the planet carrier resulting in the sun gear being connected with the second output shaft and the planetary gear set being fixed, (2) in its power distributing four-wheel-drive condition, the sliding sleeve is engaged with the sun gear and the sliding tube is disengaged with the planet carrier resulting in the sun gear being connected with the second output shaft and the planetary gear set being operated in a differential action, (3) in its rear-wheel-drive condition the sliding sleeve is disengaged with the second output shaft and engaged with a stationary portion of the casing resulting in the second output shaft being free to rotate, the sun gear being locked and the planetary gear being set to be operated in planetary overdrive action and (4) in its neutral condition, the sliding sleeve being disengaged with the second output shaft and with the stationary portion while the sliding tube is disengaged with the planet carrier resulting in the sun gear and the second output shaft being free to rotate.

The synchronizing means is provided to inhibit non-synchronous engagement of the sun gear with the stationary portion of the second output shaft.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
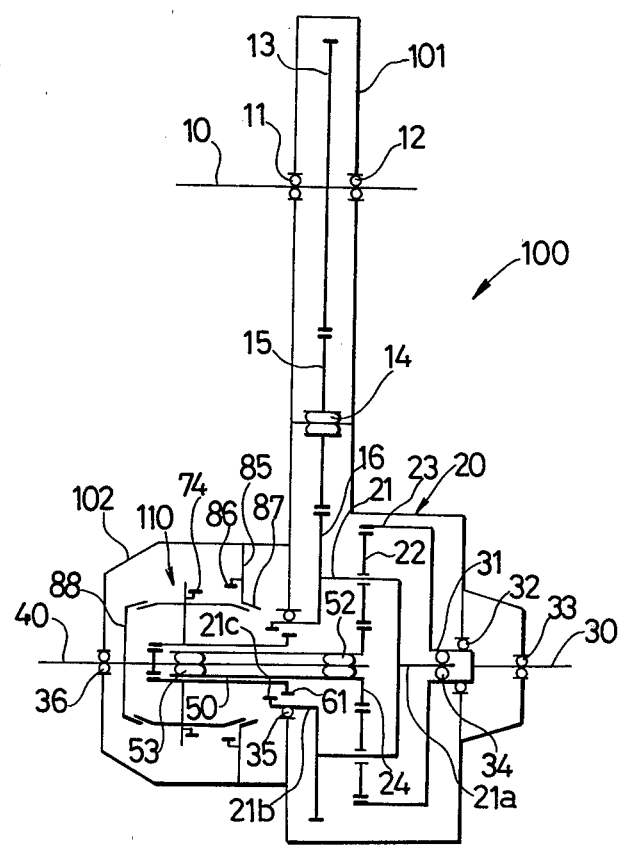
FIG. 1 is a schematic constitutional view illustrating a first embodiment of a power distributing device according to the present invention.

Referring now to the drawings, and more particularly to FIG. 1, a power distributing device according to the present invention is generally indicated by reference numeral 100. An input shaft 10 is rotatably mounted on a casing 101 by bearings 11 and 12, and connected with an output shaft of a transmission of a vehicle (not shown). A driving gear 13 fixed to the input shaft 10 is engaged with an intermediate idler gear 15 rotatably mounted on the casing 101 by a bearing 14. The intermediate idler gear 15 is engaged with a driven gear 16 secured to a planet carrier 21 of a plane planetary gear set 20. A fixed number of planet gears 22 are rotatably carried on the planet carrier 21. The right end journal 21a of the planet carrier 21 is rotatably supported inside a hollow journal 31 of a first output shaft 30 for transmitting power to the rear wheels by a bearing 34 while the left end journal 21b is supported on the casing 101 by a bearing 35. The planet gears 22 are engaged with a ring gear 23 secured to the hollow journal 31 and with a sun gear 24. Second output shaft 40 for transmitting power to the front wheels is rotatably supported on an extension housing 102 extending from the casing 101 by a bearing 36 and on a hollow shaft 50 integrally formed with the sun gear 24 and extending leftwards by bearing 52 and 53. Reference numeral 110 designated a power train changing means having a synchronizing means, which is the principal unit of the present invention. Detailed explanation will be made hereinafter referring to FIGS. 2 to 4.

Figure 2:
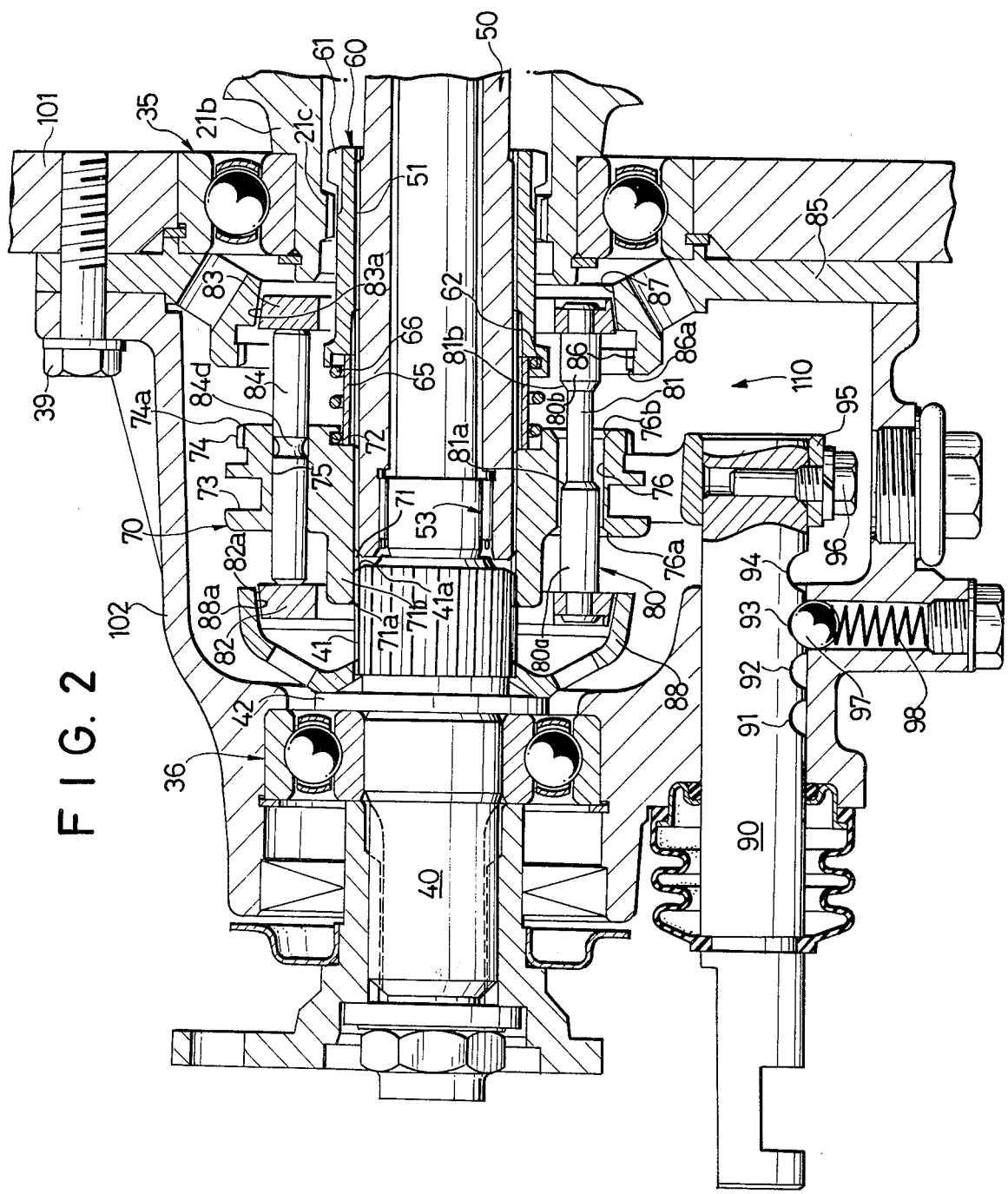
FIG. 2 is a detailed sectional view of a power train changing unit having a synchronizing device.

FIG. 2 is a sectional view of the power changing device in operation in the power distributing four-wheel-drive condition. Second peripheral teeth 61, provided on the right end of a sliding tube 60 which is engaged with the peripheral spline teeth 51 of the hollow shaft 50 and slidable in the axial direction, is positioned adjacent to and disengaged with internal teeth 21c provided internally on the left end journal 21b of the planet carrier 21. A sliding sleeve 70 is engaged with and slidably mounted on the left end part of the peripheral spline teeth 51 in the axial direction. The first internal spline teeth 71 at the left end portion 71b of the sleeve 70 is engaged with the peripheral spline teeth 41 of the second output shaft 40.

A sleeve 65 is held between the left end surface of the sliding tube 60 and the right end surface of the sliding sleeve 70 by the retracting force of a spring 66, both ends thereof being held in the groove 62 provided on the left end of the sliding tube 60 and the groove 72 provided on the right end of the sliding sleeve 70, respectively. Thrust pins 84 are slidably mounted in a fixed number of first holes 75 provided on the sliding sleeve 70 in equal circumferential pitches. Guide pins 80 are loosely inserted in second holes 76 also provided on the sliding sleeve 70 in a displaced phase relative to the second holes 75. First and second ends 80a, 10b of each guide pin 80 are fixed to conical rings 82 and 83, respectively, first end 80a having a greater axial length than second end 80b. Both ends of each thrust pin 84 are in contact with the conical rings or second and first contacting elements 82 and 83 respectively at the surfaces thereof facing the sliding sleeve 70. An outer ring 88 is connected to the second output shaft 40 by the spline teeth 41. The internal conical surface 88a and the rear surface of the outer ring 88 are in contact with the external conical surface 82a of the conical ring 82 and the flange portion 42 of the second output shaft 40, respectively.

The conical ring 83 is so positioned that the external conical surface 83a thereof is positioned closely to the internal conical first contacting surface 87 of a stationary member 85 which is secured between the extension housing 102 and the casing 101 by bolts 39. A control rod 90, mounted on the extension housing 102 and slidably operable in its axial direction relative to the housing 102, is yieldably held in any of its predetermined positions by a ball engaging with one of detent notches 91, 92, 93 and 94 respectively being pushed by a spring 98. On the right end of the control rod 90 is fixed, by a bolt 96, a yoke 95 engaged in a circumferential groove 73 of the sliding sleeve 70 to shift the sliding sleeve 70 in its axial direction.

In the power distribution device of the present invention thus constituted, when the power train changing device 110 having a synchronizing device is conditioned for operation as illustrated in FIG. 2, the power transmitted from the input shaft 10 to the driven gear 16 through the driving gear 13 and the intermediate idler gear 15 is divided into two parts; a part of the input power is transmitted to the first output shaft 30 through the ring gear 23 for driving the rear wheels and the rest of the power is transmitted from the sun gear 24 to the second output shaft 40 through the hollow shaft 50 and the sliding sleeve 70 for driving the front wheels. The power distributing proportion for the first and second output shafts is dependent on the ratio between the number of the teeth Zs of the sun gear 24 and the number of teeth Zr of the ring gear 23. The difference in the revolving speed between both output shafts is caused by the difference in the effective diameter between the front and rear wheels (caused by difference in air pressure of the tires) or irregular surface condition of the road, however, there is only a slight difference in the revolving speed between the output shafts when driving on a normal road.

With the unit in the power distributing four-wheel-drive condition, when the control rod 90 is shifted leftwards until the ball 97 engages with the detent notch 94, the sliding sleeve 70 is shifted leftwards by the yoke 95 thus pulling the sliding tube 60 with the spring 66 to engage the peripheral teeth 61 with the internal teeth 21c, while the hollow shaft 50 and the second output shaft 40 remain connected with the sliding sleeve 70. Accordingly, the plane planetary gear set 20 is fixed to become ineffective as to a power distributing function so that the second output shaft 40 and the first output shaft 30 are directly connected and then the power transmitted to the driven gear 16 is directly transmitted to both output shafts 30 and 40. This condition for operation is the direct four-wheel-drive condition.

Figure 3:
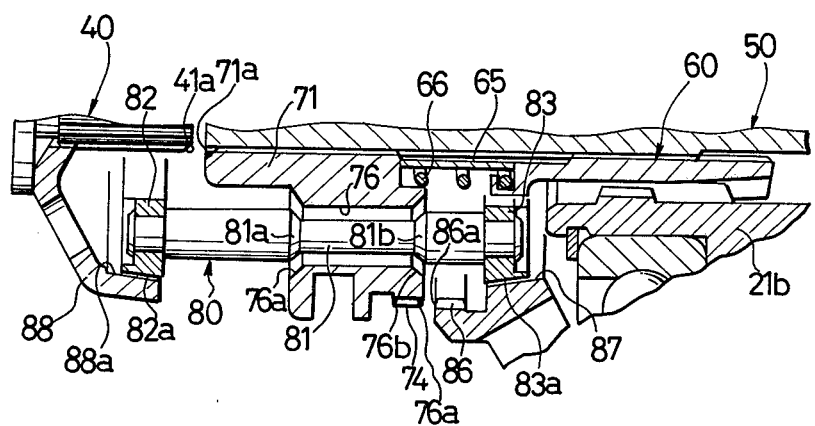
FIG. 3 is a partial cross-sectional view of a device similar to FIG. 2 illustrating the device as being selected in the neutral condition.

With the device being in the power distributing four-wheel-drive condition as illustrated in FIG. 2, when the control rod 90 is shifted rightward until the ball 97 engages with the detent notch 92, the yoke 95 displaces the sliding sleeve 70 rightward so that the left end portion 71b of the sliding sleeve 70 having first internal spline teeth 71 is disengaged from the peripheral spline teeth 41 of the second output shaft 40 as illusrated in FIG. 3. In this state, a ball (not shown), provided on the sliding sleeve 70 and pushed by a compression spring, engages with the groove 84d on the thrust pin 84, then the sun gear 24 of the plane planetary gear set 20 is allowed to freely rotate so that the power transmitted to the driven gear 16 merely drives the sun gear without transmitting power either to the second output shaft 40 or the first output shaft 30. This condition for operation is the neutral condition.

Figure 4:
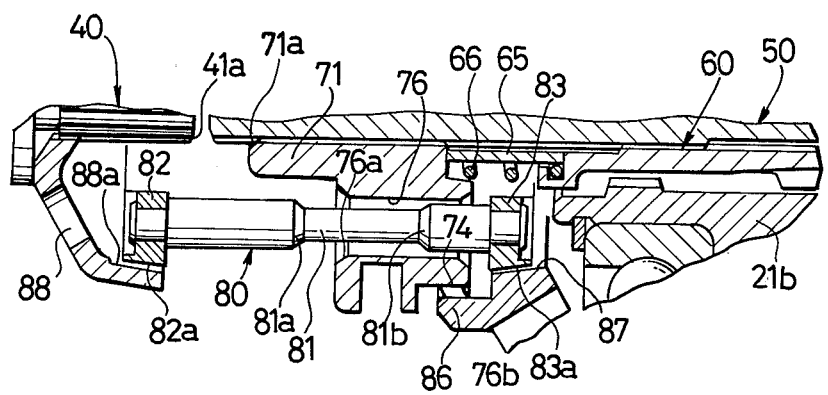
FIG. 4 is a partial cross-sectional view of a device similar to FIG. 2 illustrating the device as being selected in the rear-wheel-drive condition.

Starting from the neutral condition, when the control rod 90 is pushed rightward to shift the sliding sleeve 70 rightward, first the thrust pin 84 pushes the conical ring 83 rightward so that the external conical surface 83a of the conical ring 83 and the internal conical surface 87 of the stationary member 85 are frictionally coupled to apply a braking force to the conical ring 83 rotating together with the hollow shaft 50 and then the conical ring 83 is pushed by the sliding sleeve 70 via guide pin 80. Then a part 81 having a reduced diameter (narrow part) of the guide pin 80 comes in contact with the hole 76 and the second tapered axial portion 81b fits in the second tapered or countersunk end portion 76b of the hole 76. Consequently, the rightward pressure applied to the sliding sleeve 70 is transmitted from the second tapered part 76b to the tapered part 81b to push the conical ring 83 with the guide pin 80 thus frictionally coupling the external conical surface 83a and the internal conical surface 87 more firmly and, therefore, the braking force (synchronizing force) working on the conical ring 83 is increased and the rotation of the hollow shaft 50 and the sun gear 24, which is formed integrally with the hollow shaft 50, is braked until finally stopped. A chamfer 74a of the first peripheral dog teeth 74 of the sliding sleeve 70 and a chamfer 86a of the internal dog teeth 86 of the stationary portion 85 cooperate to facilitate engagement of the dog teeth 74 and 86 as shown in FIGS. 2 and 4. In the state as shown in FIG. 4, the sun gear 24 is locked so that the power transmitted to the driven gear 16 is transmitted only to the first output shaft 30 through the ring gear 23. In this state, the revolving speed of the ring gear 23 and the first output shaft 30 is higher than the revolving speed of the driven gear 16 and the planet carrier 21. The revolving speed increasing rate e is, $$e = \frac{Zr + Zs}{Zr}$$

where Zr is number of the teeth of the ring gear 23 and Zs is number of the teeth of the sun gear 24. In this state, the power is not transmitted to the second output shaft 40. The control rod 90 is retained at the position with the ball 97 engaged with the detent notch 91 so that the power train changing device is maintained in the operating condition as shown in FIG. 4. This condition of operation is the rear-wheel-drive condition.

Starting from the state as shown in FIG. 4, when the control rod 90 is pushed leftward, the sliding sleeve 70 is shifted leftward to disengage the peripheral dog teeth 74 and the internal dog teeth 86 of the stationary portion 85 and the device 100 is thus in its neutral condition as shown in FIG. 3 so that the sun gear is allowed to freely rotate.

When the control rod 90 is pushed leftward still further starting from the neutral condition, the conical ring 82 is pushed leftward by the thrust pin 84 so that the external conical surface 82a of the conical ring 82 is frictionally coupled with the internal conical second contacting surface 88a of the outer ring 88 engaged with the spline teeth 41 of the second output shaft 40. Consequently, the conical ring 82 is frictionally engaged with the outer ring 88 and the rotating speed of the conical ring 82 exceeds the rotating speed of the sliding sleeve 70 so that the part 81 having a reduced diameter (narrow part) of the guide pin 80 comes in contact with the wall surrounding hole 76, while the first tapered axial portion 81a fits in the tapered part 76a of the hole 76. Accordingly, the force applied to the sliding sleeve 70 in the leftward direction is transmitted from the first tapered or countersunk end portion to the tapered part 81a so that the guide pin 80 pushes the conical ring 82 and the external conical surface 82a is more firmly pushed against the internal conical surface 88a and then the frictional force (synchronizing force) dragging the conical ring 82 increases and the revolving speed of the conical ring 82 and the sliding sleeve 70 is increased until finally synchronized with the revolving speed of the outer ring 88 and the second output shaft 40. Then the chamfer 71a at the left end of the spline teeth 71 of the sliding sleeve 70 and the chamfer 41a of the spline teeth 41 of the second output shaft 40 cooperate to facilitate the engagement of the spline teeth 71 and the spline teeth 41. The device 100 is thus in its power distributing four-wheel-drive condition as shown in FIG. 2.

It is usual that the operation of the power train changing device 110, provided with such a synchronizing device as hereinbefore described, is performed while the clutch of the transmission gear unit is disconnected and the transmission of the power of engine from transmission gear unit to the power distributing device is cut off, therefore, smooth power train changing is possible while the vehicle is running.

The synchronizing impulse of the synchronizing device for the power distributing device of the present invention will be compared with the synchronizing impulse of the conventional power train employing a combined power train of the plane planetary gear set and the synchronizing device provided by the U.S. Pat. No. 3,426,623, as cited earlier.

The equation of motion at the changing timing is:

$$M = I \frac{d\omega}{dt} \mp Mr$$

with the following definitions:

M: capacity of the synchronizing clutch (the conical ring),
t: synchronizing time,
I: moment of inertia of the revolving member to be synchronized,
ω: revolving speed of the revolving member to be synchronized,
Mr: the moment of viscosity and stirring resistance of the lubricant and the moment of revolving resistance of the bearing and gears, inclusive.

Neglecting Mr, $$S = M \cdot \Delta t$$

where S is synchronizing impulse.

Provided that the moment of inertia I of the revolving member to be synchronized is an equivalent moment of inertia at the planet carrier 21 (the sum of moment of inertias of the planet carrier 21, the driven gear 16, the intermediate idler gear 15, the driving gear 13, the input shaft 10, the gears of the transmission gear unit, the transmission shaft and clutches connected with the input shaft 10), and the moment of inertia of the planet gears 22, the sun gear 24 and the hollow shaft 50 is small enough to be neglected, capacity of the synchronizing clutch M and synchronizing impulse S are given by the following equations.

First, concerning the device of the present invention, in decreasing or increasing the revolving speed of the sun gear 24 of the plane planetary gear set 20, the capacity of the synchronizing clutch required for synchronizing the revolving speed of the sun gear 24 with that of the stationary portion 85 or with the second output shaft 40 in shifting-up from the power distributing four-wheel-drive condition to the rear-wheel-drive condition and in shifting-down from the rear-wheel-drive condition to the power distributing four-wheel-drive condition is defined as follows:

$$M = \frac{Z_S}{Z_S + Z_R} \cdot I \cdot \frac{d\omega}{dt}$$

$$S = \frac{Z_S}{Z_S + Z_R} \cdot I \cdot \left[ \int \frac{d\omega}{dt} dt \right]$$

Secondly, concerning the conventional device, the capacity and the synchronizing impulse of the synchronizing clutch in the shifting-up operation are defined by the same equations as those of the present invention because the revolving speed of the sun gear is synchronized with that of the stationary portion when the revolving speed of the sun gear of the plane planetary gear set is decreased. When the revolving speed of the sun gear is increased, the sun gear is synchronized with the planet carrier so that the capacity M' and the impulse S' of the synchronizing clutch are defined as, $$M' = \frac{Z_S}{Z_R} \cdot I \cdot \frac{d\omega}{dt}$$

$$S' = \frac{Z_S}{Z_R} \cdot I \cdot \left| \int \frac{d\omega}{dt} dt \right|$$

Then, the ratio of S' to S is, $$\frac{S'}{S} = \frac{Z_S + Z_R}{Z_R}$$

It will be well understood that the synchronizing impulse of the device of the present invention is smaller than that of the device employing the conventional power train. Due to the fact that the synchronizing impulse is small, it is interpreted that the synchronizing clutch has a surplus capacity if the same synchronizing device is employed. This is one of the advantages of the present invention.

It is well known that a more severe condition is imposed to the device in a shifting-down operation rather than in shifting-up operation, during the synchronize changing. Accordingly, the device of the present invention of a smaller synchronizing impulse is superior to the device employing the conventional power train.

Figure 5:
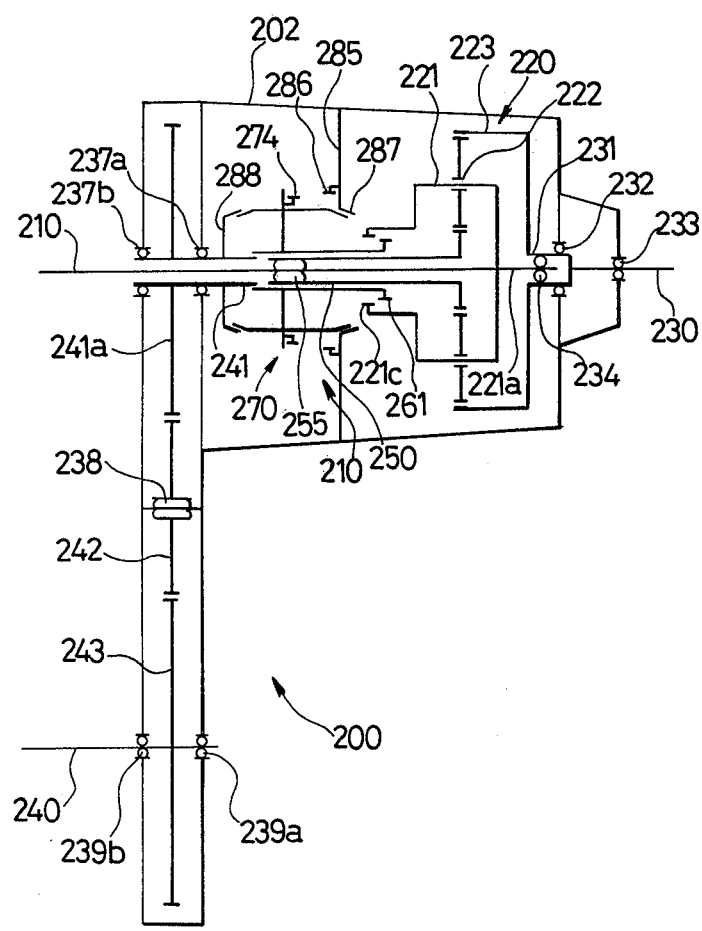
FIG. 5 is a schematic constitutional view illustrating a second embodiment of a power distributing device according to the present invention.

FIG. 5 is a schematic illustration of a second embodiment of the power distributing device according to the present invention which is entirely similar to the power distributing device as described referring to FIG. 1 except that an input shaft 210 is disposed concentrically with a first output shaft 230 for transmitting power to rear wheels, directly connected with a planet carrier 221 and supported on a hollow shaft 250 by a bearing 255 and that a second output shaft 241 as formed in a spline shaft is rotatably supported on a casing 202 by bearings 237a and 237b, a gear 241a fixed on the spline shaft 241 is engaged with an intermediate idler gear 242 rotatably supported on a casing 202 by a bearing 238 and the intermediate idler gear 242 is engaged with a gear 243 fixed on an output shaft 240 for transmitting power to front wheels rotatably supported on the casing 202 by bearings 239a and 239b.

Explanation of the manner of operation and of the power distributing device thus constituted and designated generally by a reference numeral 200 will be omitted insofar as it will be easily understood from what has been described on the first embodiment. In FIG. 5, the parts designated by reference numerals having the same last two figures with the reference numerals in FIG. 1 are identical with or similar to the corresponding parts.

It may be obvious from the detailed description as provided hereinbefore that according to the present invention, the power train can be smoothly changed while driving the vehicle by employing the power distributing device of the present invention comprising a planet carrier of a plane planetary gear set connected with a driven gear, a ring gear connected with a first output shaft, a sun gear adapted to be selectively connected with a stationary portion of the device or a second output shaft and a synchronizing device combined with a selector for selectively connecting the sun gear with the stationary portion or the second output shaft. Furthermore, as described above, the capacity of the synchronizing clutch in shifting-up operation and in shifting-down operation being regarded as equal, the power train changing device is compact and advantageous in the synchronizing capacity. Still further, upon the sliding sleeve being allowed to slide further in its axial direction after it has performed the synchronizing action, then engaged the sun gear with the second output shaft, the sun gear and the planet carrier can be engaged while the sun gear and the second output shaft remain engaged and also a synchronizing device can be combined with a power distributing device capable of selectively changing between a multiple driving gear trains as a rear-wheel-drive gear train, a power distributing four-wheel-drive gear train and a direct four-wheel-drive gear train.

It is to be understood that the synchronizing device applicable to the power distributing device of the invention is not limited to the pin-type synchronizer, but other synchronizers, such as a Porche-type synchronizer, may be used to obtain similar effect.

What is claimed as new and desired to be secured by Letters Patent of the United States is:

1. A power distributing device for a vehicle comprising:
   a nonrotary casing having a stationary internal member;
   gear teeth disposed upon said stationary internal portion of said casing;
   a plane planetary gear set mounted within said casing;
   said planetary gear set comprising a sun gear, a ring gear, a planet carrier and planet gears wherein said planet carrier carries said planet gears such that said planet gears engage said sun gear and said ring gear;
   a journal having a plurality of gear teeth provided therein and operatively associated with said planet carrier;
   a shaft member operatively associated with said sun gear;
   an input shaft drivably engaged with said planet carrier;
   a first output shaft connected with said ring gear;
   a second output shaft arranged coaxially with said sun gear;
   spline teeth peripherally disposed upon said second output shaft;
   power train changing means disposed within said nonrotary casing and operatively associated with said planetary gear set;
   sliding sleeve means mounted upon and movably engaged with said shaft member and operatively associated with said power train changing means;
   first internal spline teeth disposed axially along an inner surface portion of said sliding sleeve means such that said first internal spline teeth selectively engage said spline teeth peripherally disposed upon said second output shaft;
   first peripheral gear teeth disposed on an end portion of said sliding sleeve means such that said first peripheral gear teeth selectively engage said gear teeth disposed upon said stationary internal portion of said casing;
   said sliding sleeve means having at least a first and second hole formed therein, said first hole defining first and second countersunk end portions adjacent respective surface portions of said sliding sleeve means;
   second peripheral gear teeth disposed at an end portion of said sliding sleeve means such that said second peripheral gear teeth selectively engage said gear teeth formed within said journal;
   synchronizing means disposed within said nonrotary casing and operatively associated with said power train changing means and which further comprises:
   a first contacting surface disposed upon said stationary internal portion of said casing;
   a second contacting surface mounted upon said second output shaft;
   at least one guide pin loosely mounted within said first hole formed in said sliding sleeve means,
   a first contacting element fixed on a first end of said at least one guide pin for selectively contacting said first contacting surface,
   a second contacting element fixed on a second end of said guide pin opposite said first end of said guide pin for selectively contacting said second contacting surface;
   at least one thrust pin loosely mounted within said second guide hole formed in said sliding sleeve means for selectively pushing said first and second contacting elements against said first and second contacting surfaces, respectively, upon selective movement of said sliding sleeve means;
   said guide pin comprising first and second end portions having unequal axial lengths for effecting selective engagement of said first and second contacting elements with said first and second contacting surfaces, respectively, during movement of said sliding sleeve means about said guide pin, an inner axial portion disposed between said end portions and having a diameter less than said end portions, and first and second tapered axial portions disposed between said inner axial portion and said end portions of said guide pin such that said first and second tapered axial portions define a boundary between said inner axial portion and said first and second end portions wherein said first and second tapered axial portions selectively contact said first and second countersunk end portions of said first hole formed in said sliding sleeve means such that movement in a first axial direction of said sliding sleeve means from a neutral non-contacting position effects frictional coupling between said first contacting element and said first contacting surface via engagement of said first tapered axial portion of said guide pin with said first countersunk end portion of said first hole formed in said sliding sleeve means and wherein engagement of said first peripheral gear teeth disposed on said sliding sleeve means with said gear teeth disposed upon said stationary internal portion of said casing locks said sun gear upon further movement of said sliding sleeve in a first direction such that said second output shaft rotates freely without receiving power from said power distributing device, and such that power is transmitted to said second output shaft from said power distributing device, and wherein first movement of said sliding sleeve means from a neutral non-contacting position in a second axial direction opposite said first axial direction effects frictional coupling between said second contacting element and said second contacting surface via engagement of said second tapered axial portion of said guide pin with said second countersunk end portion of said sliding sleeve means, and effects engagement of said first internal spline teeth with said spline teeth on said second output shaft and couples said sun gear with said second output shaft such that said planet carrier rotates freely, and wherein further movement of said sliding sleeve means in said second axial direction beyond said first movement in a second axial direction effects engagement of said second peripheral gear teeth disposed on said sliding sleeve means with said gear teeth provided within said journal of said planet carrier and fixes said sun gear with said planet carrier while said sun gear is fixed with said second output shaft such that said first end portion of said guide pin coacts with said sliding sleeve means during said further movement of said sliding sleeve means in a second axial direction such that engagement of said second tapered axial portion of said guide pin with said second countersunk end portion of said sliding sleeve means is prevented by said unequal axial length of said first end portion of said guide pin.

2. A power distributing device for a vehicle according to claim 1 wherein said sliding sleeve means further comprises:

a sliding sleeve having an annular groove formed in one end portion thereof, said spline teeth being disposed on the inner periphery of said sliding sleeve and said first peripheral teeth being disposed on said outer periphery of said sliding sleeve;

a sliding tube having an annular groove formed in one end portion thereof adjacent said sliding sleeve, said second peripheral gear teeth provided on the outer periphery of said sliding tube;

connecting means for loosely connecting said sliding sleeve with said sliding tube;

a sleeve member disposed between said sliding sleeve and said sliding tube and operatively associated with said connecting means; and a spring member operatively associated with said connecting means having one end held in said annular groove formed in said sliding sleeve and an opposite end held in said annular groove formed in said sliding tube.

* * * * *